United States Patent
Nelson (10) Patent No.: US 6,952,425 B1
(45) Date of Patent: Oct. 4, 2005

(54) PACKET DATA ANALYSIS WITH EFFICIENT AND FLEXIBLE PARSING CAPABILITIES

(75) Inventor: William M. Nelson, Los Altos, CA (US)

(73) Assignee: Cisco Technology, Inc., San Jose, CA (US)

(*) Notice: Subject to any disclaimer, the term of this patent is extended or adjusted under 35 U.S.C. 154(b) by 1037 days.

(21) Appl. No.: 09/714,793

(22) Filed: Nov. 14, 2000

(51) Int. Cl.[7] .............................................. H04L 12/54

(52) U.S. Cl. .................... 370/429; 370/412; 370/407

(58) Field of Search .......................... 370/389, 390, 370/392, 393, 395.1, 396, 395.31, 395.4, 400, 432, 468, 477; 380/28, 36, 37, 42, 43; 713/160; 709/205, 220, 236

(56) References Cited

U.S. PATENT DOCUMENTS 6,671,681 B1 * 12/2003 Emens et al. .................. 707/5

* cited by examiner

Primary Examiner—Wellington Chin
Assistant Examiner—Mark A Mais (74) Attorney, Agent, or Firm—Beyer, Weaver & Thomas, LLP.

(57) ABSTRACT

Methods and apparatus which facilitate the handling of data between platforms interconnected by any of a variety of network environments are disclosed. In general terms, the present invention represents an improvement over conventional packet parsing and searching mechanisms. The parse mechanism sequentially analyzes each character of the packet data and passes relevant characters to the search mechanism as soon as each character is reached. Preferably, the characters of each data field are parsed character-by-character. In one implementation, prior to searching a relevant data field, the parser initializes the appropriate search mechanism based on at least the data field type (e.g., the cookie field or URL field of an HTTP request). Each character of the relevant data is then passed sequentially to the search mechanism, where a search state are obtained for each passed character. Accordingly, the parser passes each character of the relevant data fields to the search mechanism. Since the parser passes the well-defined fields of standard protocols, such as HTTP and FTP, parsing may be efficiently performed without referencing memory (e.g., parsing is implemented in micro-code). When the parser reaches the end of the relevant data field, the parser may then cause the search mechanism to output search results associated with the search state of the last searched character. Alternatively, the parser may initiate another search for another data field, which is subsequently parsed and searched character-by-character as recited above for the first field.

44 Claims, 7 Drawing Sheets

PACKET DATA ANALYSIS WITH EFFICIENT AND FLEXIBLE PARSING CAPABILITIES

BACKGROUND OF THE INVENTION

The present invention relates to methods and apparatus for analyzing packet data transmitted and received within a network. More specifically, this invention pertains to parsing and/or searching procedures for determining how to handle packet data.

Packet parsing and searching procedures are conventionally performed by analyzing entire packet fields as a whole. That is, a search is performed on an entire packet field to determine how to handle the packet data. This approach is generally effective for parsing and searching small fixed length fields, such as IP addresses, but is less effective in handling longer, variable length fields, such as URLs in HTTP requests or arbitrary fields. By way of a specific example, a particular packet field, such as the URL or destination IP address, is matched to a particular set of destination servers to which the corresponding packet data is to be forwarded.

In a specific application, packet data is received into a layer 7 switch that "sits" in front of a plurality of routers. The layer 7 switch searches through a database for the received packet data's destination IP address, port, and URL. The search result indicates, for example, a set of servers that are configured to receive and handle such packet data. The search result may then be used to determine to which specific server the packet data is to be routed (e.g., by using a conventional load balancing technique). For instance, HTTP requests pertaining to textual data are routed to a first group of servers; graphics to a second group; and SSL to a third group. A conventional load balancing algorithm (e.g., round robin) is used to select a server within the particular group.

Although conventional parse and search mechanisms work well in many applications, they have associated disadvantages. For example, a search procedure is only performed after a relevant data field is parsed. Such methods typically require two passes over the field in question, the first to delineate the beginning and end of the field and the second to actually search it. Conventional parsing and searching techniques also fail to provide a flexible mechanism for parsing through varying types of data and data fields.

As the services available and traffic within the Internet increases, parsing and searching efficiency correspondingly becomes more important. In sum, given the increase of traffic on the Internet and World Wide Web and the growing bandwidth demands of ever more sophisticated multimedia content, there has been constant pressure to find more efficient ways to parse and search packet data while maintaining flexibility in the type of data and data fields that can be parsed and searched.

SUMMARY OF THE INVENTION

Accordingly, the present invention provides methods and apparatus which facilitate the handling of data between platforms interconnected by any of a variety of network environments. In general terms, the present invention represents an improvement over conventional packet parsing and searching mechanisms. The parse mechanism sequentially analyzes each character of the packet data and passes relevant characters to the search mechanism as soon as each character is reached. Preferably, the characters of each data field are parsed character-by-character. In one implementation, prior to searching a relevant data field, the parser initializes the appropriate search mechanism based on at least the data field type (e.g., the cookie field or URL field of an HTTP request). Each character of the relevant data is then passed sequentially to the search mechanism, where a search state are obtained for each passed character. Accordingly, the parser passes each character of the relevant data fields to the search mechanism. Since the parser passes the well-defined fields of standard protocols, such as HTTP and FTP, parsing may be efficiently performed without referencing memory (e.g., parsing is implemented in microcode). When the parser reaches the end of the relevant data field, the parser may then cause the search mechanism to output search results associated with the search state of the last searched character. Alternatively, the parser may initiate another search for another data field, which is subsequently parsed and searched character-by-character as recited above for the first field.

In one embodiment, the invention pertains to a method for handling packet data having a plurality of data segments sent from a first node to a second node within a computer network. A first parse state is obtained based on a first data segment of the packet data. A first search state is obtained that is based at least on the first data segment and that is associated with obtaining the first parse state. A second parse state is obtained based on a second data segment of the packet data and the first parse state. A second search state is obtained that is based at least on the second data segment and the first search state and that is associated with obtaining the second parse state. A third parse state is obtained based on a third data segment of the packet data and the second parse state, and search results are output based on the second search state and that is associated with obtaining the third parse state.

In a preferred embodiment, the first data segment, the second data second, and the third data segment are each a character within the packet data. In a specific implementation, a first initial parse state is set based on a protocol of the packet data (e.g., the protocol is a session type such as HTTP, FTP, or SSL), wherein the first and second parse states are based on the first initial parse state. In one aspect, the obtaining of the first, second, and third parse states are implemented within micro-code without referencing memory. In one implementation, the first and second data segments belong to a same first data field within the packet data, and an initial search state is set prior to obtaining the first and second search states, wherein the first and second search states are based on the initial search state. The first initial search state is based on at least a type of the first data field and a direction of propagation of the packet data (e.g., whether the data is inbound to a server or outbound from a server).

In a further implementation, a fourth parse state is obtained based on a fourth data segment of the packet data and the third parse state, and a third search state is obtained that is based at least on the fourth data segment and that is associated with obtaining the fourth parse state. A fifth parse state is obtained based on a fifth data segment of the packet data and the fourth parse state, and a fourth search state is obtained that is based at least on the fifth data segment and the third search state and that is associated with obtaining the fifth parse state. A sixth parse state is obtained based on a sixth data segment of the packet data and the fifth parse state, and search results are output based on the fourth search state and that is associated with obtaining the sixth parse state. The fourth and fifth data segments belong to a same second data field that differs from the first data field. In a specific embodiment, a second initial search state is set prior to obtaining the third and fourth search states, wherein the third and fourth search states are based at least on the second initial search state. In another specific embodiment, the second initial second search state is based on at least the type of the second data field, and the second initial search differs from the first initial search. The second initial search state is further based on a direction of propagation of the packet data.

In a further embodiment, the first data segment belongs to a first packet, and the second data segment belongs to a second packet. The first packet and the second packet are received, where the second packet is received after the first packet. The first search state and the first parse state are stored, and obtaining the second parse state is based on the stored first parse state and obtaining the second search state is based on the stored first search state. In a specific embodiment, either the first or second segment is replaced with a replacement data segment so that either a first or a second search state is obtained for the replacement data segment.

In another embodiment, the invention pertains to a computer system operable to handle packet data having a plurality of data segments sent from a first node to a second node within a computer network. The computer system includes one or more processors and one or more memory. At least one of the memory and processors are adapted to provide at least some of the above described method operations. In yet a further embodiment, the invention pertains to a computer program product for handling packet data having a plurality of data segments sent from a first node to a second node within a computer network. The computer program product has at least one computer readable medium and computer program instructions stored within at least one of the computer readable product configured to cause a processing device to perform at least some of the above described method operations.

In yet another embodiment, an apparatus for handling packet data having a plurality of data segments sent from a first node to a second node within a computer network is disclosed. The apparatus includes means for parsing the packet data, means for initializing a search based on the parsing of the packet data, and means for outputting search results based on a searching procedure performed on the packet data and the parsing of the packet data. Preferably, the apparatus also includes means for initializing the parsing of the packet data.

The preferred embodiment provides several advantages. For example, character-by-character parsing provides a flexible mechanism for implementing diverse search types, such as regular expression matching and protocol field hashing. Character-by-character parsing also allows analysis across packet boundaries, e.g., by storing the parse and search result state of the last character that was analyzed.

These are the features and advantages of the present invention will be presented in more detail in the following specification of the invention and the accompanying figures which illustrate by way of example the principles of the invention.

DETAILED DESCRIPTION OF SPECIFIC EMBODIMENTS

Reference will now be made in detail to a specific embodiment of the invention. An example of this embodiment is illustrated in the accompanying drawings. While the invention will be described in conjunction with this specific embodiment, it will be understood that it is not intended to limit the invention to one embodiment. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

The parsing and searching mechanisms described further below may be implemented for any suitable applications. In one embodiment, parsing and searching may be performed for a web caching application. That is, search results are produced that specify which cache device, if any, is available for a particular port 80 destination. In another application which is illustrated below, search results are produced for a load balancing application. The search results are used to form a policy that is to be applied to the load balancing algorithm(s). By way of example, parsing and searching mechanisms are implemented within a Layer 7 Load Balancing Switch.

Figure 1:
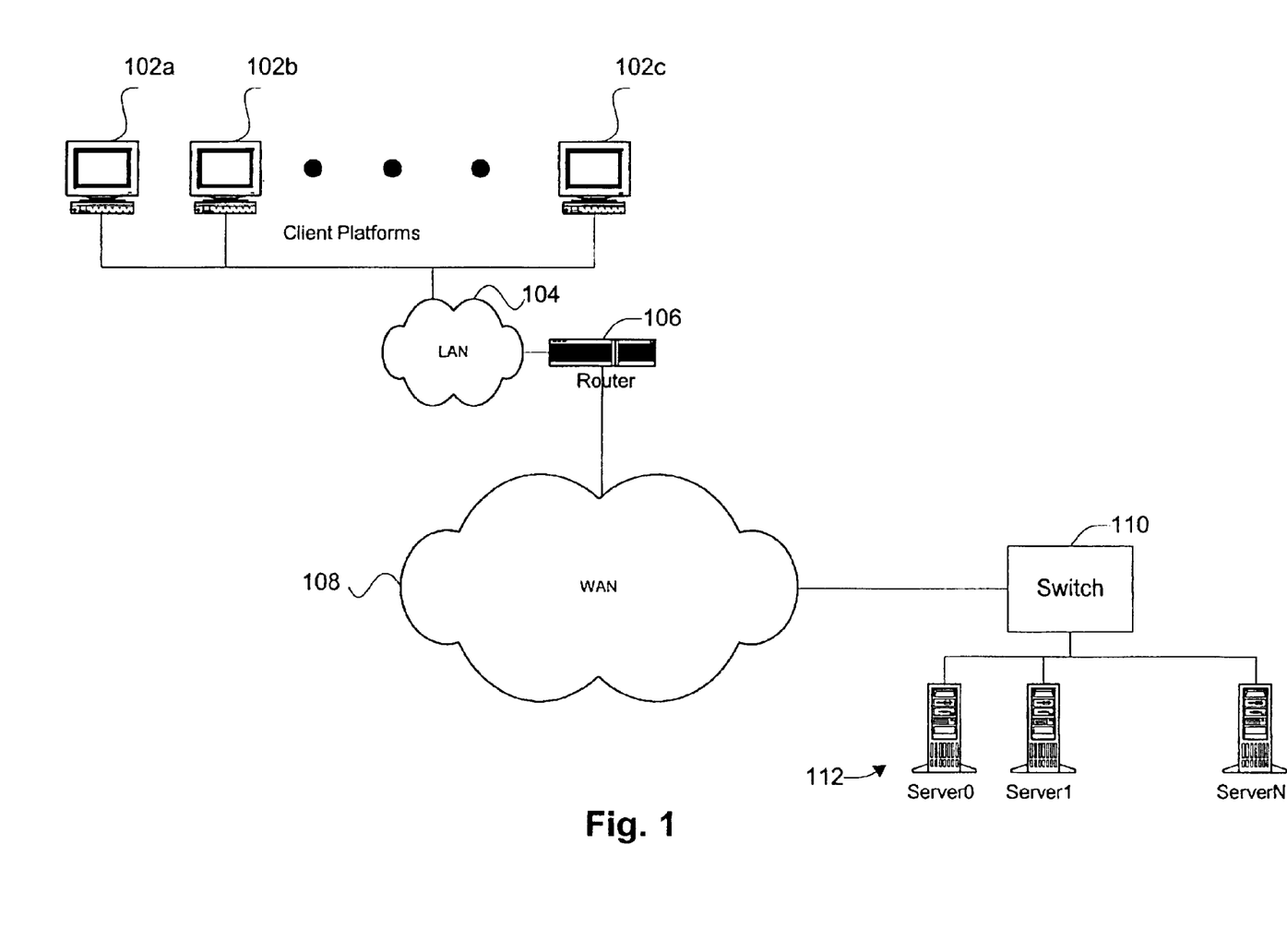
FIG. 1 is a simplified network diagram which will be used to describe a specific embodiment of the present invention as applied within a Layer 7 Load Balancing Switch.

FIG. 1 is a simplified network diagram which will be used to describe a specific embodiment of the present invention as applied within a Layer 7 Load Balancing Switch. Of course, although the present invention is described in terms of a specific load balancing application, this is not meant to limit the scope of the invention to this specific application. According to this specific implementation, a plurality of client machines 102 which are resident on a local area network (LAN) 104 communicate via router 106 and wide area network (WAN) 108, e.g., the internet, with a destination site 112. Of course, some or all of the clients 102 may communicate with the router 106 through various other configurations, rather than through a LAN. For example, a client may be coupled directly to the router 106 or there may be one or more intermediate routers between a client 102 and the router 106.

Generally speaking, when a client platform (e.g., 102*a*) communicates with some remote server (e.g., 112), whether via the Internet or an intranet, it crafts a data packet which defines a TCP connection between the two hosts, i.e., the client platform and the destination server. More specifically, the data packet has headers which include the destination IP address, the destination port, the source IP address, the source port, and the protocol type. The destination IP address might be the address of a well known World Wide Web (WWW) search engine such as, for example, Yahoo, in which case, the protocol would be TCP and the destination port would be port 80, a well known port for http and the WWW. The source IP address would, of course, be the IP address for the client platform and the source port would be one of the TCP ports selected by the client. These five pieces of information define the TCP connection. Of course, any other suitable communication protocol may be utilized, besides or in addition to TCP.

As shown in FIG. 1, a switch 110 is also interposed between the clients 102 and the destination site 112. In one embodiment, the switch may include one or more distribution mechanisms for handling packet data arriving into the switch 110 that is destined for site 112. The distribution mechanisms generally determine to which server of destination site 112 to send the received packet data. The switch 110 also handles packet data from one of the servers 112 (e.g., Server0) to a client (e.g., client 102a).

Figure 2:
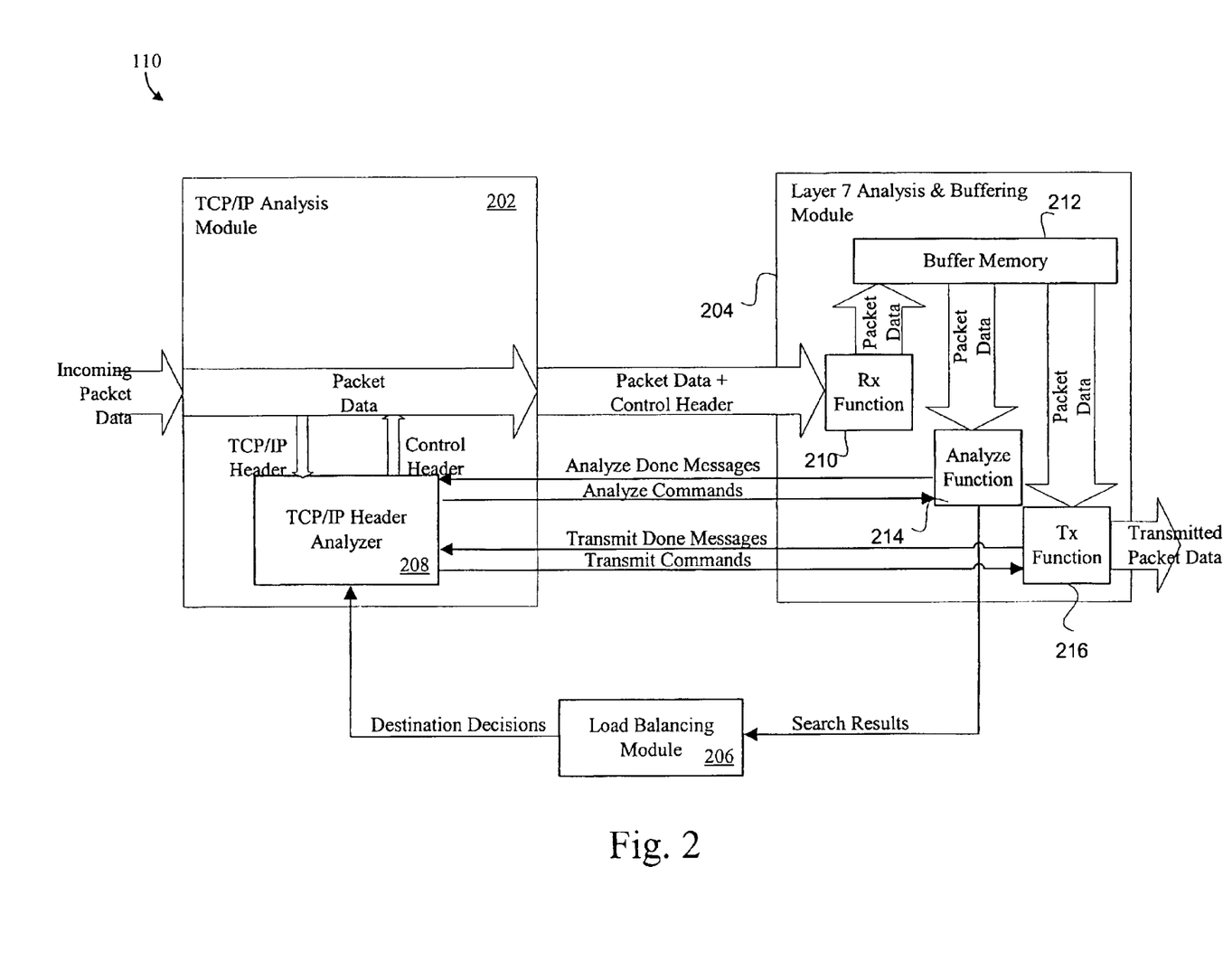
FIG. 2 is a diagrammatic representation of the Switch of FIG. 1 in accordance with one embodiment of the present invention.

FIG. 2 is a diagrammatic representation of the switch 110 of FIG. 1 in accordance with one embodiment of the present invention. As shown, the switch 110 includes a TCP/IP Analysis Module 202, a Layer 7 Analysis and Buffering Module 204, and a Load Balancing Module 206. Incoming packet data is received by TCP/IP Analysis Module 202 and forwarded to Layer 7 Analysis and Buffering Module 204. Transmitted packet data is output from the Layer 7 Module 204. For example, incoming packet data may originate from a client 102 via the wide area network (WAN) 108 or originate from a server 112 of FIG. 1. Likewise, the transmitted packet data may be output to one of the servers 112 or a client 102 via WAN 108 of FIG. 1.

The TCP Module is generally configured to present ordered and error-free packet data to Layer 7 Module 204. The TCP Module 202 also may send control signals to the Layer 7 Module. One or more control signals (referred to as "analysis commands") specify packet data analysis procedures within the Layer 7 Module. One or more control signals may also control packet data storage within the Layer 7 Module or within any other suitable module. The Layer 7 Module may also receive any other type and number of commands, in addition to or instead of analyze commands and storage commands, from the TCP Module. The TCP Module 202 may perform any other suitable packet analysis and manipulation procedures. Specific embodiments of the TCP module 202 and its relation to the Layer 7 Module 204 and Load Balancing Module 206 are described further in concurrently filed U.S. application, having application Ser. No. 09/714,673 which commonly assigned application is incorporated herein by reference in its entirety.

The Layer 7 Module parses through the packet data and performs searches on such parsed data based on one or more "analysis commands" received from the TCP Module. Of course, the Layer 7 Module may also determine how to parse and search the data itself without help from the TCP Module. The Layer 7 Module may also output the search results to the Load Balancing Module 206. Examples of search results include which user-configured regular expressions a URL HTTP cookie field matches or the result of hashing a session ID. The Load Balancing Module may then determine a destination for the packet data based on the input search results. This destination decision is communicated to the TCP Module 202, which then instructs the Layer 7 Module to transmit the packet data to the destination indicated by the Load Balancing Module 206. Of course, the Load Balancing Module 206 itself may directly communicate and instruct the layer 7 module on how to transmit the packet data or the Layer 7 Module 204 may determine how to transmit the packet data based on its own search results. In other applications, the Load Balancing Module may be replaced by a web cache module that determines a cache destination based on search results.

The packet data may be stored in any suitable location prior to transmission out of Switch 110. In the illustrated embodiment, the Layer 7 Module 204 includes Buffer Memory 212 for storing the packet data. The Layer 7 Module 204 also includes a Receive Function Block 210 for writing into the Buffer Memory 212 and a Transmit Function Block 216 for reading from the Buffer Memory. The Transmit Function Block 216 also transmits the read packet data out of Switch 10. The TCP Module controls writing and reading functions of the respective Receive and Transmit Functions Blocks of the Layer 7 Module (e.g., by a "receive command" and a transmit commands, respectively). The Receive and Transmit Function Blocks 210 and 216 and their interactions with the TCP Module 202 are described further in the above referenced concurrently filed U.S. application. Although the Buffer Memory 212 is shown as being located within the Layer 7 Module 204; of course, Buffer Memory may be located elsewhere. By way of examples, Buffer Memory may be located in both the TCP Module 202 and Layer 7 Module 204 or only within the TCP Module 202 or externally from either module 202 or 204. The Buffer Memory(s) may also be controlled by any suitable module (e.g., the TCP Module, the Load Balancing Module, or the Layer 7 Module).

The analyze command may include any suitable parameters for indicating which packet data is to be parsed and/or a type and/or order of fields of such packet data. In the embodiment, the analyze commands include the following parameters: buffer address, analysis_length, session_id, first_of_session, and session_type or VSID (virutal server ID). The analysis_length specifies the number of bytes within the packet data to be parsed. The session_id identifies the Layer 7 session to which the packet data belongs. In other words, the session_id is a mechanism for differentiating between different sessions. The first_of_session indicates whether this packet data is the beginning packet data for a particular session (e.g., session_id). The session_type identifies the Layer 7 protocol that is to be parsed for this particular session. For example, the session_type may indicate whether the packet data is to be parsed as HTTP, FTP (File Transfer Protocol), or SSL (Secure Sockets Layer) traffic. In one embodiment, the session_type is the virtual server identifier (e.g., destination IP address and port). Differentiation may be required between SSL and http data since different servers are likely to be used for these two different data types. Additionally, these two data types may require parsing of different fields within the packet data. For example, an encryption field is parsed within the SSL data and not within the HTTP data.

Like the TCP Module 202, the Layer 7 Module 204 may include any other suitable mechanisms (besides the receive and transmit function blocks) for analyzing and/or handling packet data. As shown, the Layer 7 Module 204 also includes an Analyze Function Block 214 arranged to receive "analyze commands" from the TCP/IP header analyzer 208 which specify how to handle the packet data read from a particular location within buffer memory 212. Of course, the packet data may be read from memory located externally from the layer 7 module 204. The Analyze Block 214 also signals the TCP Module 202 when an analysis procedure (i.e., parsing and searching) is finished.

The Analyze Function Block 214 also outputs search results for one or more fields within the packet data and the received analyze commands. The search results may also be based on any number of received sets of packet data and/or associated analysis command(s). The search results may be in any suitable form and depends on the particular application requirements. By way of specific examples, the search results may specify a group of servers that meet the requirements for a particular session. In another example, the search results may indicate regular expression matches on the URL, further indicating whether access to URL is allowed. In the illustrated embodiment, the Load Balancing Module 206 uses one or more search results to form a policy for determining a destination server 112 for the packet data.

Figure 3:
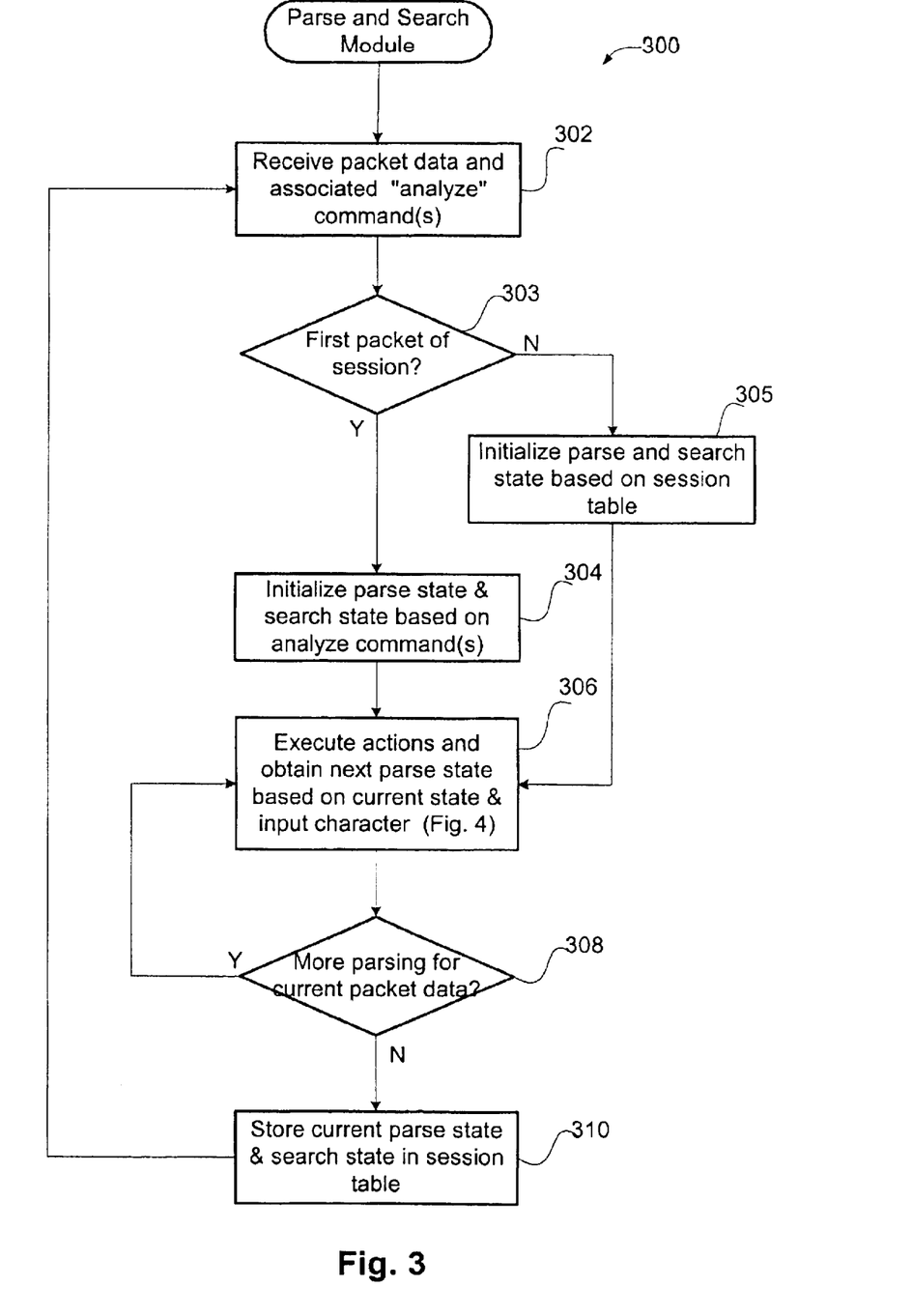
FIG. 3 is a flowchart illustrating a parse and search procedure in accordance with one embodiment of the present invention.

Any suitable implementation may be used for the Analyze Function Block 214 so as to facilitate on-the fly character-by-character parsing and searching. That is, any suitable combination of hardware and/or software may be used to implement such packet analysis capabilities. FIG. 3 is a flowchart illustrating a parse and search procedure 300 in accordance with one embodiment of the present invention. Initially, packet data and one or more associated "analyze" commands are received (e.g., into the Layer 7 Module 204) in operation 302. It is then determined whether this packet data represents the first packet of a particular session in operation 303. If it is the first packet, a parse state and search state is then initialized based on the analyze commands in operation 304 and/or the type of packet data. The initial parse state is determined by one or more values of the analyze command parameters (e.g., session_type), as well as packet data type (e.g., whether the packet data is inbound to a server or outbound from a server). If it is not the first packet, a parse state and search state are initialized based on stored parse and search states (e.g., from a session table) in operation 305.

Figure 4A:
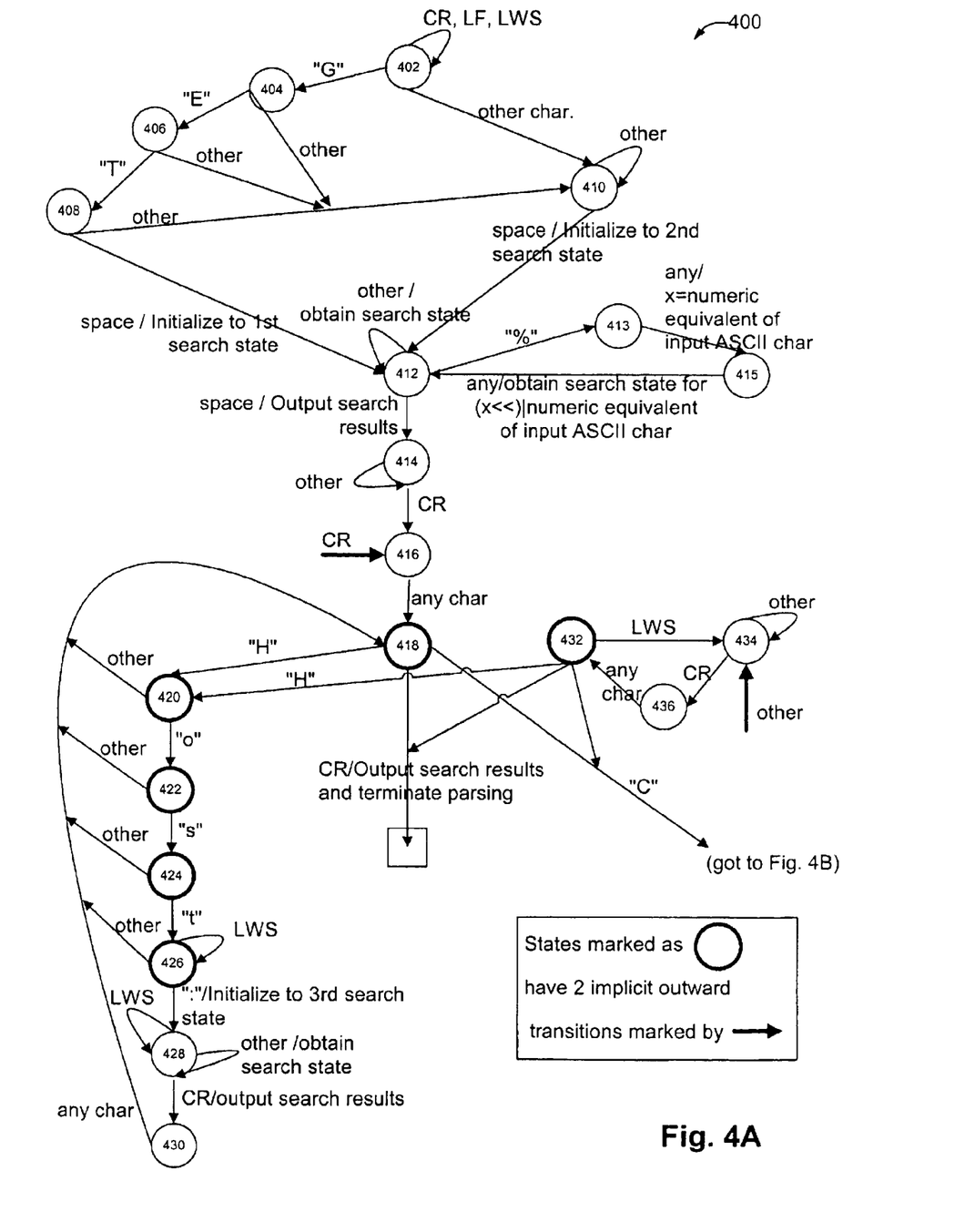
FIGS. 4A and 4B illustrates a state machine of an HTTP request parsing procedure in accordance with one embodiment of the present invention.

Actions are executed based on the current parse state and input character of the packet data and a next parse state is then obtained in operation 306. Actions may include initiating a search, obtaining a next search state, terminating the parse procedure, or outputting search results (e.g., to the Load Balancing Module 206). These actions are described further below with reference to FIG. 4. A next parse state may also be obtained without execution of an action.

It is then determined whether more parsing is to be performed for the current packet data in operation 308. If more parsing is to be performed, operation 306 is repeated and a next parse state is obtained and a next set of actions are executed in operation 306. If there is no more parsing (e.g., the end of a data packet is reached or parsing is terminated), the current parse state and search state may be stored, for example, within a session table in operation 310. By way of example, the parse and search states are stored and associated with the session_id of the current packet data. The parsing and searching procedure 300 is repeated as new packet data is received. The parse and search state may be re-initialized (e.g., based on the start of a new session) in operation 304, or the stored parse and search states may be utilized in operation 305 (i.e., operation 304 is skipped). These mechanisms for storing a parse state and search state for already parsed packet data and then using the stored states for subsequent packet data allows parsing across packet boundaries.

Any suitable mechanisms may be implemented for the parsing and searching. In the illustrated embodiment, the parsing is substantially implemented in code with minimal memory accesses. That is, the actual information that describes what the parse machine is looking for is completely implemented in micro-code. Alternatively, the parse mechanism is implemented in hardware (e.g., an ASIC or an FPGA device). In contrast, the search mechanism is table or memory driven. The search procedure includes the accessing of tables or memory. In one embodiment, regular expression and hashing type searches are implemented. For example, in a regular expression search, a character pattern is searched for within a look up table. When a match is found, the matching table entry is output as the search result.

Figure 4B:
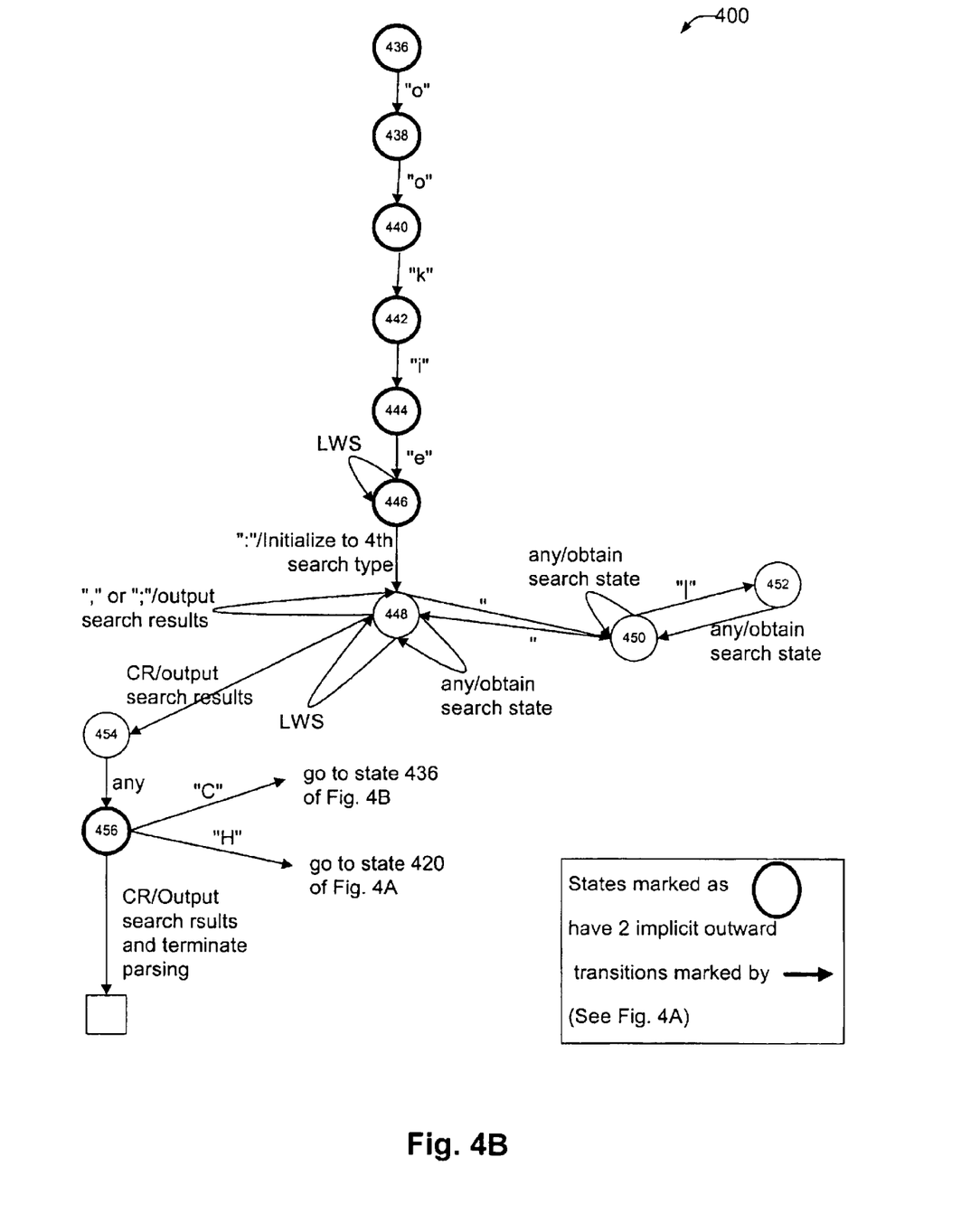

FIGS. 4A and 4B illustrates a state machine 400 of an HTTP request parsing procedure in accordance with one embodiment of the present invention. The parse state is initialized to state 402 of this state machine 400 when packet data and analyze commands indicating an HTTP type request (e.g., the first_of_session variable indicates that the packet data is the beginning of a session and the session_type variable indicates an HTTP type session) are received by the Layer 7 Module 204 (e.g., operations 302 and 304 of FIG. 3). For example, this state machine is initialized for incoming packet data (i.e., from a client 102 to a server 112) that is in the form of an HTTP request (e.g., indicated by the session_type, VSID, or protocol type). In this diagram, the following abbreviations are used: CR (carriage return), LF (line feed), and LWS (linear white space).

The state machine 400 may be used, for example, to parse the packet data "GET/hello.html HTTP/1.0" received from a web client (e.g., 102a). For the first character "G", the parse state changes from 402 to 404 (e.g., operation 306 of FIG. 3). Note that no action is executed for this parse state transition. Parsing continues for the next character "E" (e.g., operations 308 and 306) by obtaining a next parse state 406 (without an action being executed). The parsing states then advance from 406 to 408 to 412 for the "T" and space characters (without an action being executed).

When the parse state goes from state 408 to 412 for the "space" character, a particular search is initialized (i.e., an action is executed). For this packet data, the search is initialized to a search procedure that is appropriate for a "GET" request. For each character between the first space and the second space character (i.e., "/hello.html"), the parse state remains at state 412. The action executed for each character includes obtaining one or more search states. That is, one or more search states are obtained for each character within the string "/hello.html". The search states that are obtained depend on the particular search machine that has been previously initiated by the parse machine 400. The search machine may perform any number and type of searches, such as a regular expression search or a hashing type search. The type of search depends on which search was last initialized by the parse machine (e.g., in the transition from parse states 408 and 412).

Figure 5:
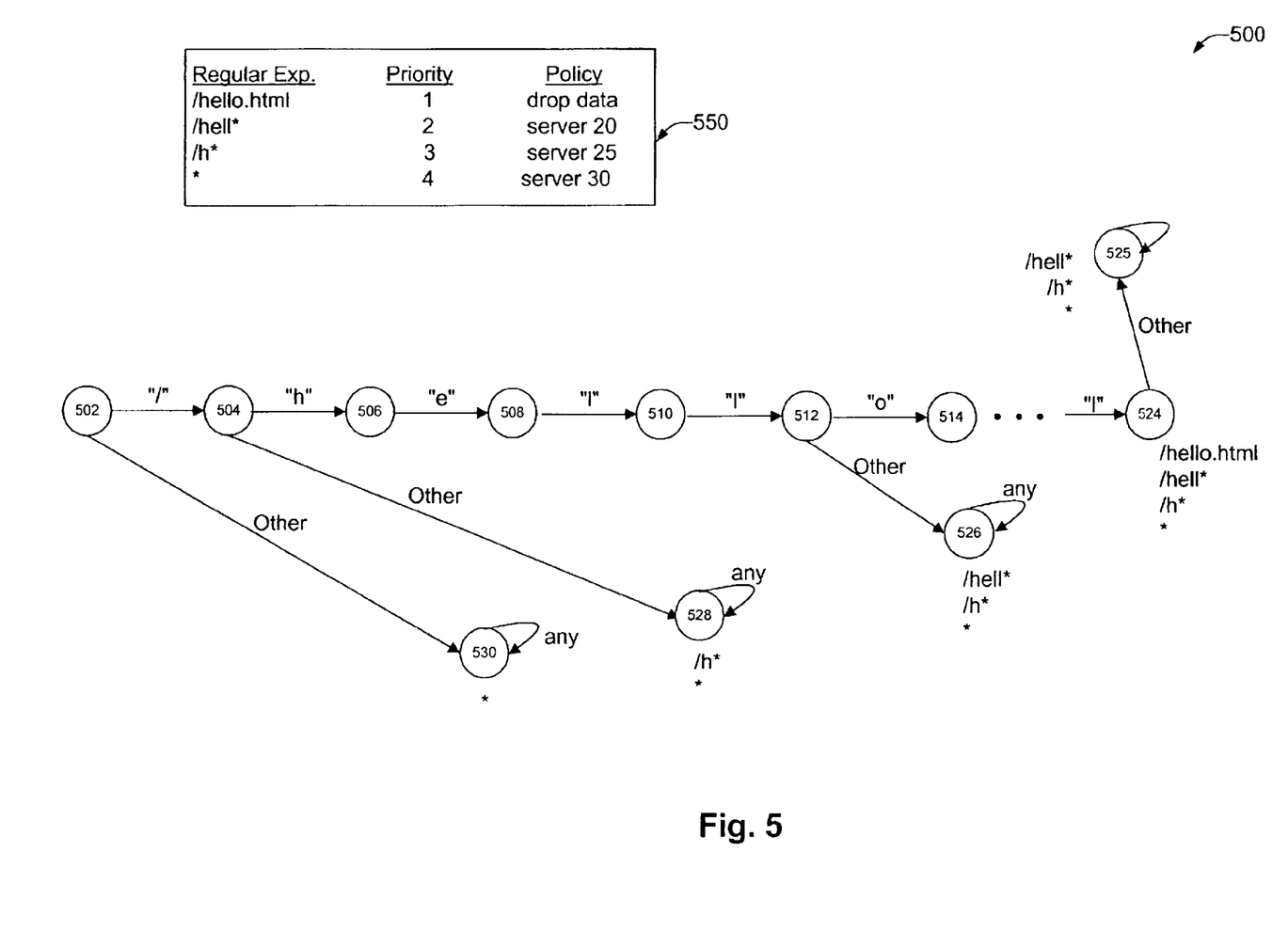
FIG. 5 illustrates an example of a regular expression search that may be initiated by the parse machine for GET type packet data in accordance with one embodiment of the present invention.

FIG. 5 illustrates an example of a regular expression search 500 that may be initiated by the parse machine 400 for GET type packet data (e.g., by transitioning from parse state 408 to 412) in accordance with one embodiment of the present invention. As each character is parsed, the search state changes. For example, search states 502 through 524 are sequentially obtained for the regular expressions /hello.html. Each search state may be associated with one or more matching regular expressions. As shown, search state 524 is associated with regular expressions /hello.html, /hell*, /h*, and *. Search state 525 is associated with regular expressions /hell*, /h*, and *. Search state 526 is associated with regular expressions /hell*, /h*, and *. Similarly, search state 528 is associated with regular expressions /h* and *. Search state 530 is associated with all other regular expressions.

As shown in table 550, each regular expression may also correspond to one or more policies. The policy for regular expression /hello.html specifies that the corresponding packet data is to be dropped. The policy for /hell* indicates that server 20 is to be used. The policy for h* and * expressions indicate server 25 and server 30, respectively. As shown in table 550, the policies may be prioritized. Thus, when a particular search state is reached, a final policy may be determined based the corresponding regular expressions' priorities. In the example, the policy for search state 524 is determined to be "drop the packet data" since the matching regular expression /hello.html has the highest priority within the list of matching expressions for this search state.

The search states may be matched to policies within any suitable logic module. In the illustrated implementation, the Layer 7 Module outputs the search state results to the Load Balancing Module in the form of an index (e.g., search state number 524) to a memory address (e.g., within an SRAM device), which index corresponds to a policy entry. The Load Balancing Module accesses the indexed memory to obtain the corresponding policy entry (e.g., drop the connection). Alternatively, the Load Balancing Module may receive an index to a list of matching regular expressions and then determine which policy to follow based on the priorities of such expressions. In the "/hello.html" example, the connection is dropped since the memory index corresponds to a policy that indicates dropping the connection. If one or more policies are obtained (e.g., for multiple search results on multiple packet fields), the Load Balancing Module determines a subset of policies that are common to all of the matching policies and has a highest priority. For example, if a first search result (e.g., from a URL search) includes policies 20, 21, and 25 and a second search result (e.g., from an Access Control List or ACL search) includes policies 18, 22, 25, and 27, policy 25 is followed since this policy is common to both search result sets.

Note that for other types of HTTP packet data (besides GET requests), a different type of search is initiated by traversing from parse state 402 to 410 to 412. In the illustrated example of FIGS. 4A and 4B, different search initializations correspond to different search state machines. If other characters are received instead of the string "GET" for any of the parse states 402 through 408, the parse state 410 is obtained. After a "space" character is received in parse state 410, a second search state is initialized (instead of the first search state). The second search state is used to parse through a non-GET request.

After the data field (e.g., URL) is parsed (e.g., a carriage return (CR) character is reached in parse state 414) for either a GET or a non-GET request, parsing may be terminated (e.g., after parse state 414). Alternatively, as shown in the FIGS. 4A and 4B, parsing may continue for other fields such as "host" and "cookie" fields. Accordingly, this parsing embodiment includes parsing of "host" fields (parse states 420 through 430 of FIG. 4A) and "cookie" fields (FIG. 4B). Note that a third search type is initiated for the "host" field when transitioning between parse states 426 and 428, and a fourth search type is initiated for the "cookie" field when transitioning between parse states 446 and 448 (FIG. 4B). In this embodiment, a regular expression search is initiated for cookie fields, while a hashing type search is initiated for host fields. In this specific implementation, parsing is performed only on "host" and "cookie" headers, and all other headers are ignored. Of course, other fields may also easily be parsed and implemented within the parse state machine 400.

The parsing and searching mechanisms of the present invention allow one to easily modify what fields are searched by simply modifying the parse machine. Preferably, the parse machine is implemented in software to allow easy modification. Most preferably, each parse state is implemented by micro-code with minimal memory accessing. For example, data packet fields are not accumulated during parsing of such fields.

This state diagram 400 has a number of flexible parsing features. For example, transitions from parse state 412 to 413 to 415 and back to 412 handle URL escape sequences. During the transition from state 415 to 412, a search is performed for the replacement ASCII character (e.g., "a"). In sum, the parse machine 400 provides on-the-fly parsing and searching for escape sequences within the packet data.

The escape sequence implementation also illustrates one advantage of having a parsing machine (e.g., state machine 400) that is separate from the search mechanisms (e.g., the parser calls the searcher). That is, the parser may be easily configured to intelligently prepare the data for the search mechanism (e.g., by replacing escape sequences with ASCII characters). Additionally, the parser may pull data fields out of the packet data in a particular order, where the pulled data fields are handed off to the search mechanism.

Referring back to FIG. 1, the switch 110 may include one or more caching mechanisms, in addition to or instead of the above described distribution mechanism. The switch 110 generally "spoofs" the destination site 112. The switch 110 responds to a request from a client 102 to obtain objects from destination site 112. The switch 110 either retrieves objects from destination site 112 to then present to one of the clients or retrieves objects from its own cache (which objects were previously retrieved from the destination site 112).

It will be understood that the caching mechanisms described herein may employ any of a variety of existing file systems and remain within the scope of the invention. For example, the invention may be implemented using a Unix general purpose file system or the equivalent. A particular embodiment of the invention employs the file system described in commonly assigned, U.S. Pat. No. 5,950,205 for DATA TRANSMISSION OVER THE INTERNET USING A CACHE MEMORY FILE SYSTEM issued on Sep. 7, 1999, the entire specification of which is incorporated herein by reference for all purposes.

Alternatively, any suitable proxy mechanism may be utilized for caching requested data. For example, a Unix based proxy mechanism may be utilized. For example, a proxy may be implemented as a daemon on a Unix machine (e.g., the switch 110). Software on a client platform (e.g., 102a) on the network protected by the firewall is specially configured to communicate with the resident daemon which then makes the connection to a destination platform (e.g., 112) at the client's request. The daemon passes information back and forth between the client and destination platform (e.g., 112) acting as an intermediary or "proxy." Not only does this model provide the desired protection for the client's network, it gives the entire network the IP address of the proxy server (e.g., 110), therefore simplifying the problem of addressing of packet data to an increasing number of users. Moreover, because of the storage capability of the proxy server, information retrieved from remote servers is stored rather than simply passed through to the requesting platform (e.g., 102a). That is, by storing frequently requested data, subsequent requests for the same data may be serviced without having to retrieve the requested data from its original remote source. Of course, the Unix based proxy is not transparent to the client. That is, the client has to be specifically configured to work with the proxy. Thus, the above described transparent caching mechanisms are preferred.

Generally, the parsing and/or searching techniques of the present invention may be implemented on software and/or hardware. For example, it can be implemented in an operating system kernel, in a separate user process, in a library package bound into network applications, on a specially constructed machine, or on a network interface card. In a specific embodiment of this invention, the technique of the present invention is implemented in software such as an operating system or in an application running on an operating system.

A software or software/hardware hybrid parsing and/or searching system of this invention may be implemented on a general-purpose programmable machine selectively activated or reconfigured by a computer program stored in memory. Such programmable machine may be a network device designed to handle network traffic. Such network devices typically have multiple network interfaces including frame relay and ISDN interfaces, for example. Specific examples of such network devices include routers and switches. For example, the parsing and/or searching systems of this invention may be specially configured routers such as router models 1600, 2500, 2600, 3600, 4500, 4700, 7200, 7500, and 12000 available from Cisco Systems, Inc. of San Jose, Calif. A general architecture for some of these machines will appear from the description given below. In an alternative embodiment, the parsing and/or searching system may be implemented on a general-purpose network host machine such as a personal computer or workstation. Further, the invention may be at least partially implemented on a card (e.g., an interface card) for a network device or a general-purpose computing device.

Figure 6:
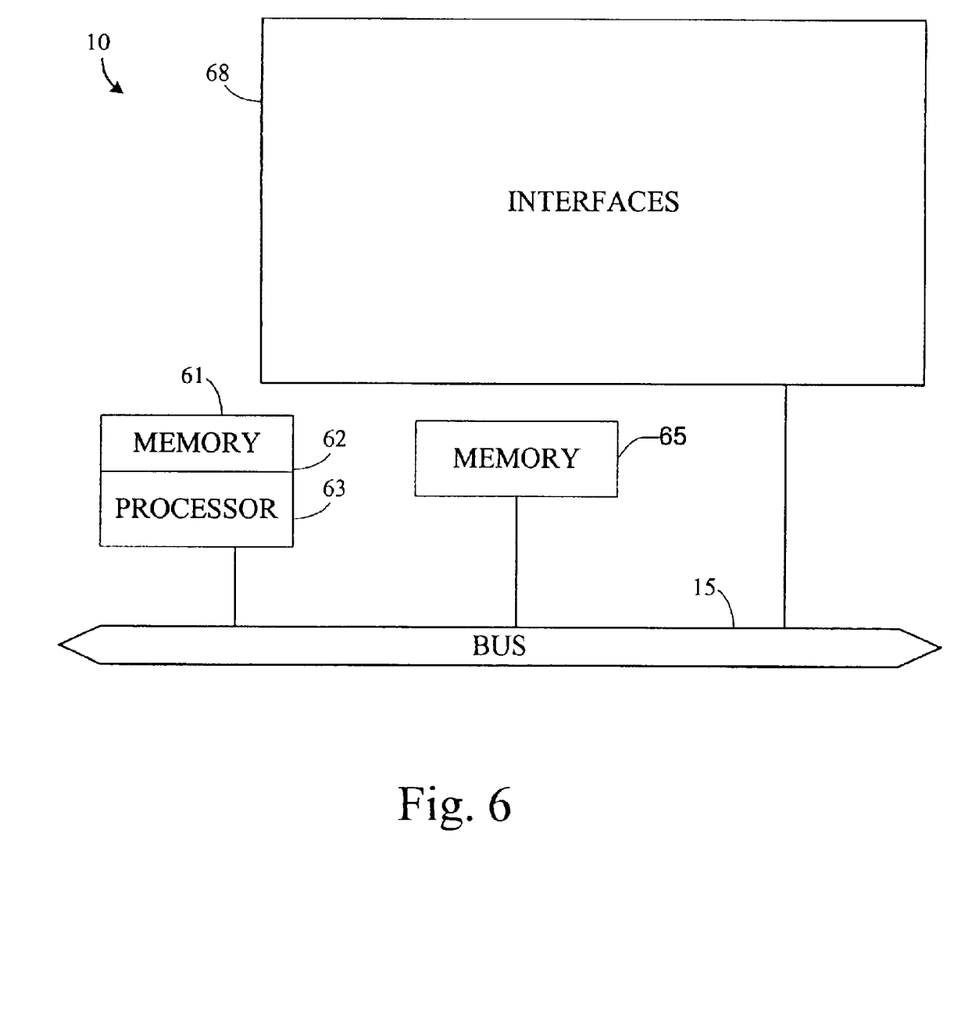
FIG. 6 is a diagrammatic representation of one implementation of one or more modules of FIG. 2 in accordance with one embodiment of the present invention.

Referring now to FIG. 6, a router 10 suitable for implementing the present invention includes a master central processing unit (CPU) 62, interfaces 68, and a bus 15 (e.g., a PCI bus). When acting under the control of appropriate software or firmware, the CPU 62 is responsible for such router tasks as routing table computations and network management. It may also be responsible for parsing through each character of packet data, initiating one or more parse types, performing searches on relevant data characters, outputting search results, etc. It preferably accomplishes all these functions under the control of software including an operating system (e.g., the Internetwork Operating System (IOS®) of Cisco Systems, Inc.) and any appropriate applications software. CPU 62 may include one or more processors 63 such as a processor from the Motorola family of microprocessors or the MIPS family of microprocessors. In an alternative embodiment, processor 63 is specially designed hardware for controlling the operations of router 10. In a specific embodiment, a memory 61 (such as non-volatile RAM and/or ROM) also forms part of CPU 62. However, there are many different ways in which memory could be coupled to the system. Memory block 61 may be used for a variety of purposes such as, for example, caching and/or storing data, programming instructions, etc.

The interfaces 68 are typically provided as interface cards (sometimes referred to as "line cards"). Generally, they control the sending and receiving of data packets over the network and sometimes support other peripherals used with the router 10. Among the interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 62 to efficiently perform routing computations, network diagnostics, security functions, etc.

Although the system shown in FIG. 6 is one specific implementation of the present invention, it is by no means the only router architecture on which the present invention can be implemented. For example, an architecture having a single processor that handles communications as well as routing computations, etc. is often used. Further, other types of interfaces and media could also be used with the router.

Regardless of network device's configuration, it may employ one or more memories or memory modules (such as, for example, memory block 65) configured to store data, program instructions for the general-purpose network operations and/or parsing and searching mechanisms described herein. The program instructions may control the operation of an operating system and/or one or more applications, for example. The memory or memories may also be configured to store a session table, search state and policy tables, regular expression lists for each search state, etc.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The invention may also be embodied in a carrier wave travelling over an appropriate medium such as airwaves, optical lines, electric lines, etc. Examples of program instructions include both machine code, such as produced by a compiler, and files containing higher level code that may be executed by the computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

What is claimed is:

1. A method for handling packet data having a plurality of data segments sent from a first node to a second node within a computer network, the method comprising:

obtaining a first parse state based on a first data segment of the packet data;

obtaining a first search state that is based at least on the first data segment and that is associated with obtaining the first parse state;

obtaining a second parse state based on a second data segment of the packet data and the first parse state;

obtaining a second search state that is based at least on the second data segment and the first search state and that is associated with obtaining the second parse state;

obtaining a third parse state based on a third data segment of the packet data and the second parse state; and outputting search results based on the second search state and that is associated with obtaining the third parse state.

2. A method as recited in claim 1, wherein the first data segment, the second data second, and the third data segment are each a character within the packet data and are not a first character within the packet data.

3. A method as recited in claim 1, further comprising setting a first initial parse state based on a protocol of the packet data, wherein the first and second parse states are based on the first initial parse state.

4. A method as recited in claim 3, wherein the protocol is a session type.

5. A method as recited in claim 3, wherein the protocol is a virtual server identifier (VSID).

6. A method as recited in claim 1, wherein the obtaining of the first, second, and third parse states are implemented within micro-code without referencing memory.

7. A method as recited in claim 1, wherein the first and second data segments belong to a same first data field within the packet data.

8. A method as recited in claim 7, further comprising setting an initial search state prior to obtaining the first and second search states, wherein the first and second search states are based on the initial search state.

9. A method as recited in claim 8, wherein the first initial search state is based on at least a type of the first data field.

10. A method as recited in claim 9, wherein the first initial search state is further based on a direction of propagation of the packet data.

11. A method as recited in claim 10, wherein the type of first data field is selected from a group consisting of a Uniform Resource Location (URL) type, an Access Control List (ACL) type, a host type, and a cookie type.

12. A method as recited in claim 9, further comprising:

obtaining a fourth parse state based on a fourth data segment of the packet data and the third parse state;

obtaining a third search state that is based at least on the fourth data segment and that is associated with obtaining the fourth parse state;

obtaining a fifth parse state based on a fifth data segment of the packet data and the fourth parse state;

obtaining a fourth search state that is based at least on the fifth data segment and the third search state and that is associated with obtaining the fifth parse state;

obtaining a sixth parse state based on a sixth data segment of the packet data and the fifth parse state; and outputting search results based on the fourth search state and that is associated with obtaining the sixth parse state, wherein the fourth and fifth data segments belong to a same second data field that differs from the first data field.

13. A method as recited in claim 12, further comprising setting a second initial search state prior to obtaining the third and fourth search states, wherein the third and fourth search states are based at least on the second initial search state.

14. A method as recited in claim 13, wherein the second initial second search state is based on at least a type of the second data field and the second initial second search differs from the first initial search.

15. A method as recited in claim 14, wherein the second initial search state is further based on a direction of propagation of the packet data.

16. A method as recited in claim 14, wherein the type of the second data field is selected from a group consisting of a Uniform Resource Location (URL) type, an Access Control List (ACL) type, a host type, and a cookie type.

17. A method as recited in claim 1, wherein the first data segment belongs to a first packet and the second data segment belongs to a second packet, and the method further comprising:

receiving the first packet;

receiving the second packet after the first packet; and storing the first search state and the first parse state, wherein obtaining the second parse state is based on the stored first parse state and obtaining the second search state is based on the stored first search state.

18. A method as recited in claim 1, wherein the search results facilitate load balancing.

19. A method as recited in claim 1, wherein the search results facilitate web caching.

20. A method as recited in claim 1, wherein the search results facilitate traffic security mechanisms.

21. A method as recited in claim 1, wherein the search results indicate a policy for handling the packet data.

22. A method as recited in claim 1, wherein the packet data is error-free and ordered.

23. A method as recited in claim 1, further comprising terminating parsing and searching based on the third parse state.

24. A method as recited in claim 1, further comprising replacing either the first or second segment with a replacement data segment so that either a first or a second search state is obtained for the replacement data segment.

25. A method as recited in claim 24, wherein the replaced first or second data segment is a character equivalent to an escape sequence.

26. A method as recited in claim 1, wherein the first and second search states are obtained based on a regular expression type search being performed for the first and second data segments.

27. A method as recited in claim 1, wherein the first and second search states are obtained based on a hashing type search being performed for the first and second data segments.

28. A computer system operable to handle packet data having a plurality of data segments sent from a first node to a second node within a computer network, the computer system comprising:

one or more processors;

one or more memory, wherein at least one of the processors and memory are adapted to:

obtain a first parse state based on a first data segment of the packet data;

obtain a first search state that is based at least on the first data segment and that is associated with the first parse state;

obtain a second parse state based on a second data segment of the packet data and the first parse state;

obtain a second search state that is based at least on the second data segment and the first search state and that is associated with the second parse state;

obtain a third parse state based on a third data segment of the packet data and the second parse state; and output search results based on the second search state and that is associated with the third parse state.

29. A computer system as recited in claim 28 wherein the first data segment, the second data second, and the third data segment are each a character within the packet data.

30. A computer system as recited in claim 28, wherein at least one of the processors and memory are further adapted to set a first initial parse state based on a protocol of the packet data, wherein the first and second parse states are based on the first initial parse state.

31. A computer system as recited in claim 28, wherein the obtaining of the first, second, and third parse states are implemented within micro-code without referencing memory.

32. A computer system as recited in claim 28, wherein the first and second data segments belong to a same first data field within the packet data.

33. A computer system as recited in claim 32, wherein at least one of the processors and memory are further adapted to set an initial search state prior to obtaining the first and second search states, wherein the first and second search states are based on the initial search state.

34. A computer system as recited in claim 33, wherein the first initial search state is based on at least the a type of the first data field.

35. A computer system as recited in claim 34, wherein the first initial search state is further based on a direction of propagation of the packet data.

36. A computer system as recited in claim 34, wherein at least one of the processors and memory are further adapted to:
    obtain a fourth parse state based on a fourth data segment of the packet data and the third parse state;
    obtain a third search state that is based at least on the fourth data segment and that is associated with obtaining the fourth parse state;
    obtain a fifth parse state based on a fifth data segment of the packet data and the fourth parse state;
    obtain a fourth search state that is based at least on the fifth data segment and the third search state and that is associated with obtaining the fifth parse state;
    obtain a sixth parse state based on a sixth data segment of the packet data and the fifth parse state; and
    output search results based on the fourth search state and that is associated with obtaining the sixth parse state,
    wherein the fourth and fifth data segments belong to a same second data field that differs from the first data field.

37. A computer system as recited in claim 36, wherein at least one of the processors and memory are further adapted to set a second initial search state prior to obtaining the third and fourth search states, wherein the third and fourth search states are based at least on the second initial search state.

38. A computer system as recited in claim 37, wherein the second initial second search state is based on at least the a type of the second data field.

39. A computer system as recited in claim 38, wherein the second initial search state is further based on a direction of propagation of the packet data.

40. A computer system as recited in claim 28, wherein the first data segment belongs to a first packet and the second data segment belongs to a second packet, and at least one of the processors and memory are further adapted to:
    receive the first packet;
    receive the second packet after the first packet; and
    store the first search state and the first parse state, wherein obtaining the second parse state is based on the stored first parse state and obtaining the second search state is based on the stored first search state.

41. A computer system as recited in claim 28, wherein at least one of the processors and memory are further adapted to replace either the first or second segment with a replacement data segment so that either a first or a second search state is obtained for the replacement data segment.

42. A computer program product for handling packet data having a plurality of data segments sent from a first node to a second node within a computer network, the computer program product comprising:
    at least one computer readable medium;
    computer program instructions stored within the at least one computer readable product configured to cause a processing device to:
    obtain a first parse state based on a first data segment of the packet data;
    obtain a first search state that is based at least on the first data segment and that is associated with the first parse state;
    obtain a second parse state based on a second data segment of the packet data and the first parse state;
    obtain a second search state that is based at least on the second data segment and the first search state and that is associated with the second parse state;
    obtain a third parse state based on a third data segment of the packet data and the second parse state; and
    output search results based on the second search state and that is associated with the third parse state.

43. An apparatus for handling packet data having a plurality of data segments sent from a first node to a second node within a computer network, the apparatus comprising:
    means for parsing the packet data;
    means for initializing a search based on the parsing of the packet data; and
    means for outputting search results based on a searching procedure performed on the packet data and the parsing of the packet data.

44. An apparatus as recited in claim 43, farther comprising means for initializing the parsing of the packet data.

* * * * *